US011769379B1

(12) United States Patent
Singh

(10) Patent No.: US 11,769,379 B1
(45) Date of Patent: Sep. 26, 2023

(54) INTELLIGENT SELF EVOLVING AUTOMATED TELLER MACHINE (ATM) DIGITAL TWIN APPARATUS FOR ENHANCING REAL TIME ATM PERFORMANCE

(71) Applicant: Bank of America Corporation, Charlotte, NC (US)

(72) Inventor: Shailendra Singh, Maharashtra (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 17/708,571

(22) Filed: Mar. 30, 2022

(51) Int. Cl.
    *G07F 19/00* (2006.01)
    *G06N 3/08* (2023.01)

(52) U.S. Cl.
    CPC ............ *G07F 19/211* (2013.01); *G06N 3/08* (2013.01); *G07F 19/206* (2013.01); *G07F 19/209* (2013.01)

(58) Field of Classification Search
    CPC .... G07F 19/211; G07F 19/206; G07F 19/209; G06N 3/08
    USPC .......................................................... 235/379
    See application file for complete search history.

(56) References Cited

U.S. PATENT DOCUMENTS

| | | | |
|---|---|---|---|
| 9,959,497 B1 | 5/2018 | Ivanov | |
| 10,732,618 B2 | 8/2020 | Xin et al. | |
| 10,921,755 B2 | 2/2021 | Virani et al. | |
| 10,929,922 B1 | 2/2021 | Velline et al. | |
| 10,939,237 B2 | 3/2021 | Dadhaniya et al. | |
| 10,943,424 B1 | 3/2021 | Pham et al. | |
| 10,943,441 B1 | 3/2021 | Watson, III et al. | |
| 11,080,970 B2 | 8/2021 | Astigarraga et al. | |
| 11,087,297 B1 | 8/2021 | Thomas et al. | |
| 11,093,914 B2 | 8/2021 | Beesetti et al. | |
| 11,094,174 B1 | 8/2021 | Ratnakaram et al. | |
| 11,100,205 B2 | 8/2021 | Burri et al. | |
| 11,100,765 B2 | 8/2021 | Farivar et al. | |
| 11,178,010 B2 | 11/2021 | Kozhaya et al. | |
| 11,185,283 B2 | 11/2021 | Hadley et al. | |
| 11,189,106 B2 | 11/2021 | Zavesky et al. | |
| 11,201,921 B2 | 12/2021 | Florit et al. | |
| 11,270,317 B2 | 3/2022 | Kim | |
| 11,282,278 B1 | 3/2022 | Zavesky et al. | |
| 11,288,308 B2 | 3/2022 | Blackburn et al. | |
| 11,288,932 B2 | 3/2022 | Watson, III et al. | |

*Primary Examiner* — Daniel A Hess
(74) *Attorney, Agent, or Firm* — Banner & Witcoff, Ltd.

(57) ABSTRACT

Aspects of the disclosure relate to ATM monitoring and enhancement. A computing platform may detect ATM performance information from an ATM. The computing platform may validate the ATM performance information against baseline ATM performance information. Based on validating the ATM performance information, the computing platform may generate a digital twin for the ATM, and may input the digital twin into a deep learning model for anomaly detection. Based on identifying that the digital twin includes an anomaly, the computing platform may update and simulate the updated digital twin. The computing platform may determine, using smart contracts stored on a distributed ledger, whether or not an update to the ATM based on the updated digital twin is approved. Based on determining that the update to the ATM is approved, the computing platform may direct the ATM to perform a configuration update based on the updated digital twin.

20 Claims, 11 Drawing Sheets

405

Security Notification

Malicious behavior has been identified at ATM #1, and one or more security actions have been executed accordingly. Please review activity at ATM #1.

Anomaly Detection Notification

An anomaly has been identified at ATM #1, and an updated configuration has been generated to correct the anomaly. One or more errors have been identified in the updated configuration. Please review and update accordingly.

INTELLIGENT SELF EVOLVING AUTOMATED TELLER MACHINE (ATM) DIGITAL TWIN APPARATUS FOR ENHANCING REAL TIME ATM PERFORMANCE

BACKGROUND

Aspects of the disclosure relate to automated teller machine (ATM) (and/or other self service kiosk) performance. In some instances, ATMs may be used to perform a variety of functions. In some instances, however, an enterprise may operate a fleet of such ATMs, which may be located in a widely distributed manner. Error detection for such ATMs may be performed by manually reviewing error logs of each ATM, which may be time consuming and an exclusively retroactive analysis (e.g., detecting errors once they have already occurred). In some instances, any errors may result in a service disruption for the corresponding ATM. Accordingly, it may be difficult for the enterprise to manage and/or maintain such ATMs at their full operating capabilities while avoiding system downtime. It may be important to improve methods for ATM management and/or maintenance to reduce system downtime and increase security.

SUMMARY

Aspects of the disclosure provide effective, efficient, scalable, and convenient technical solutions that address and overcome the technical problems associated with ATM monitoring and management. In accordance with one or more embodiments of the disclosure, a computing platform with at least one processor, a communication interface, and memory storing computer-readable instructions may receive ATM performance information from a first ATM. The computing platform may validate the ATM performance information against baseline ATM performance information. Based on validating the ATM performance information, generate a digital twin for the first ATM, where the digital twin comprises a simulated version of the first ATM. The computing platform may input the digital twin into a deep learning model to identify whether or not the digital twin includes one or more anomalies. Based on identifying that the digital twin includes the one or more anomalies, the computing platform may update the digital twin to compensate for the one or more anomalies. The computing platform may execute a simulation of the updated digital twin, where the execution of the simulation results in an error or a successful simulation. The computing platform may determine, using one or more smart contracts stored on a distributed ledger, whether or not an update to the first ATM based on the updated digital twin is approved. Based on determining that the update to the first ATM is approved, the computing platform may send one or more commands directing the first ATM to perform a configuration update based on the updated digital twin, which may cause the first ATM to perform the configuration update.

In one or more instances, the baseline ATM performance information may be specific to a location of the first ATM. In one or more instances, based on determining that the ATM performance information is not validated, the computing platform may send one or more ATM security commands to the first ATM, which may cause the first ATM to prevent distribution of currency.

In one or more examples, the computing platform may determine that the ATM performance information is not validated by detecting one or more of: information from an unanticipated device, or information of an unanticipated information type. In one or more examples, based on identifying that the digital twin does not include the one or more anomalies, the computing platform may continue to monitor the first ATM.

In one or more instances, the deep learning model may be a long short-term memory (LSTM) recurrent neural network (RNN). In one or more instances, based on detecting that the simulation resulted in error, the computing platform may send an error notification and one or more commands directing an administrator device to display the error notification, which may cause the administrator device to display the error notification.

In one or more examples, determining whether or not the update to the first ATM based on the updated digital twin is approved may include automatically identifying whether one or more rules of the one or more smart contracts are satisfied. In one or more examples, based on determining that the update to the first ATM is not approved, the computing platform may send an authorization prompt and one or more commands directing an administrator device to display the authorization prompt, which may cause the administrator device to display the authorization prompt.

In one or more instances, the computing platform may train, using historical ATM performance information, the deep learning model. The computing platform may update, based on the identified one or more anomalies, the deep learning model.

In one or more examples, the historical ATM performance information and the ATM performance information may include one or more of: electronic component information, software information, firmware information, fault codes, fault logs, incident information, geolocation information, environmental information, transaction volume information, transaction detail information, video information, and image information. In one or more examples, detecting the one or more anomalies may include detecting that a height of the first ATM should be adjusted, and the computing platform may be further configured to send a height adjustment notification to an administrator device.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 4-6 depict illustrative graphical user interfaces for automated ATM monitoring and enhancement in accordance with one or more example embodiments.

DETAILED DESCRIPTION

Figure 1A:
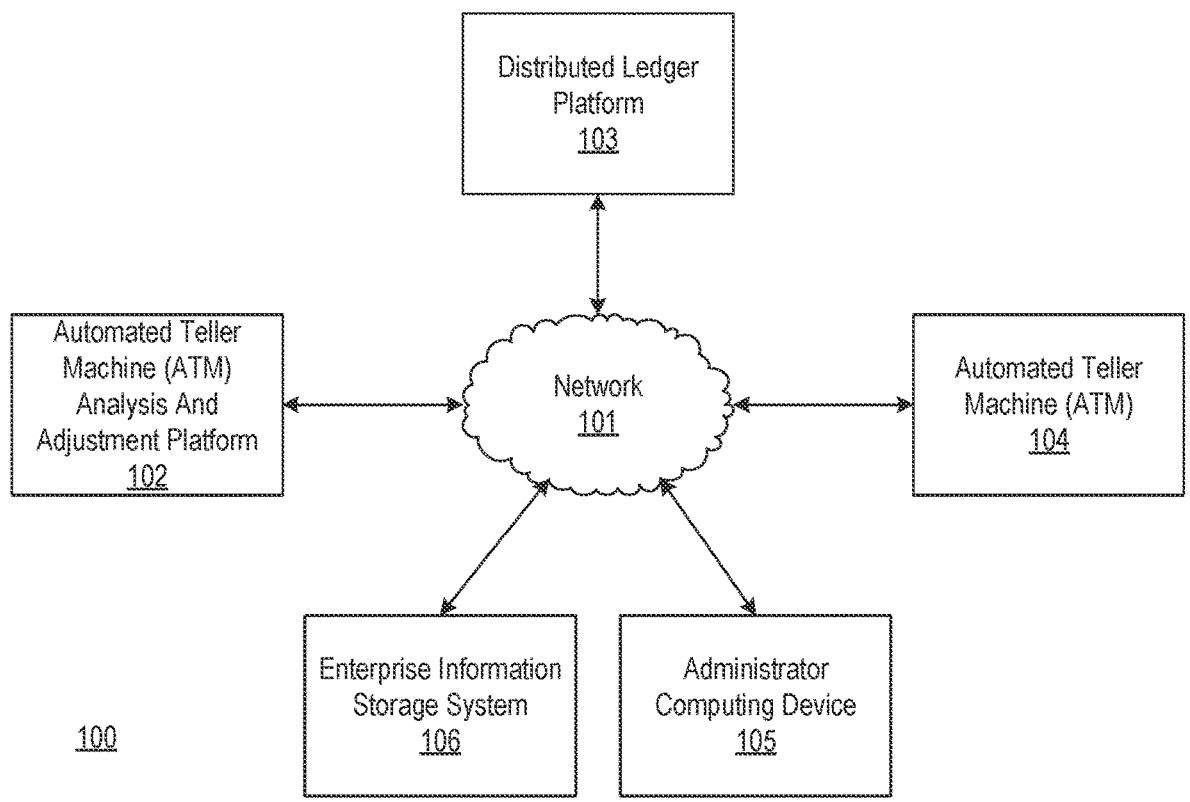
FIGS. 1A-1B depict an illustrative computing environment for automated ATM monitoring and enhancement in accordance with one or more example embodiments.

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief description of the concepts described further herein, some aspects of the disclosure relate to a system for dynamically enhancing ATMs in real time using analysis of digital twins. ATMs may be used by customers to perform financial transactions. Managing and maintaining an ATM with its full operational capabilities may be a challenging task. Accordingly, there may be a need to develop a platform that may manage ATM operations intelligently to ensure security and continuity of operations by leveraging digital twin, distributed ledger, artificial intelligence (AI), machine learning (ML), ATM, and/or 6G technology.

Accordingly, described herein is an intelligent apparatus that may automatically create an ATM digital twin based on a live data stream from an actual physical ATM unit. The automatically created ATM digital twin may be a predicted ATM configuration derived from monitoring a digital copy of a physical ATM. The method may use deep learning AI/ML algorithms (e.g., long short term memory (LSTM) neural networks, image detection, and/or other algorithms) to predict ATM configurations that balance performance and security considerations. The predicted digital twin configuration may include hardware, software, and/or environmental setups. The ATM specification derived from the predicted digital ATM twin may be passed into a distributed ledger and routed through procurement and deployment systems in real time. The entire process may be dynamic in nature, and may keep evolving new specifications for ATMs spread across different geolocations. In some instances, this method may use a distributed ledger (e.g., blockchain, holochain, and/or other distributed ledger) network to distribute validated digital twin configurations to suppliers and monitor statuses. To do so, the intelligent apparatus may implement an ATM parameter module, an ATM monitoring engine, a deep learning engine, an ATM simulation engine, an ATM digital twin creation engine, an ATM specification generation engine, and/or other modules.

Accordingly, the intelligent apparatus may sense changes in physical ATMs based on predefined parameters, which may trigger creation of enhanced digital twins of ATM units based on live data streaming. Additionally, the ATM monitoring and real time digital twins may be updated by leveraging 6G. ATM digital twin hardware, software, and/or environmental configurations may be predicted by leveraging deep learning algorithms. Distributed ledgers may be leveraged to validate and route predicted ATM configurations for both hardware and software procurement and deployment in real time. Furthermore, a dynamic self evolving ATM configuration is described that may be suitable for both high performance and maximum security.

Figure 1B:
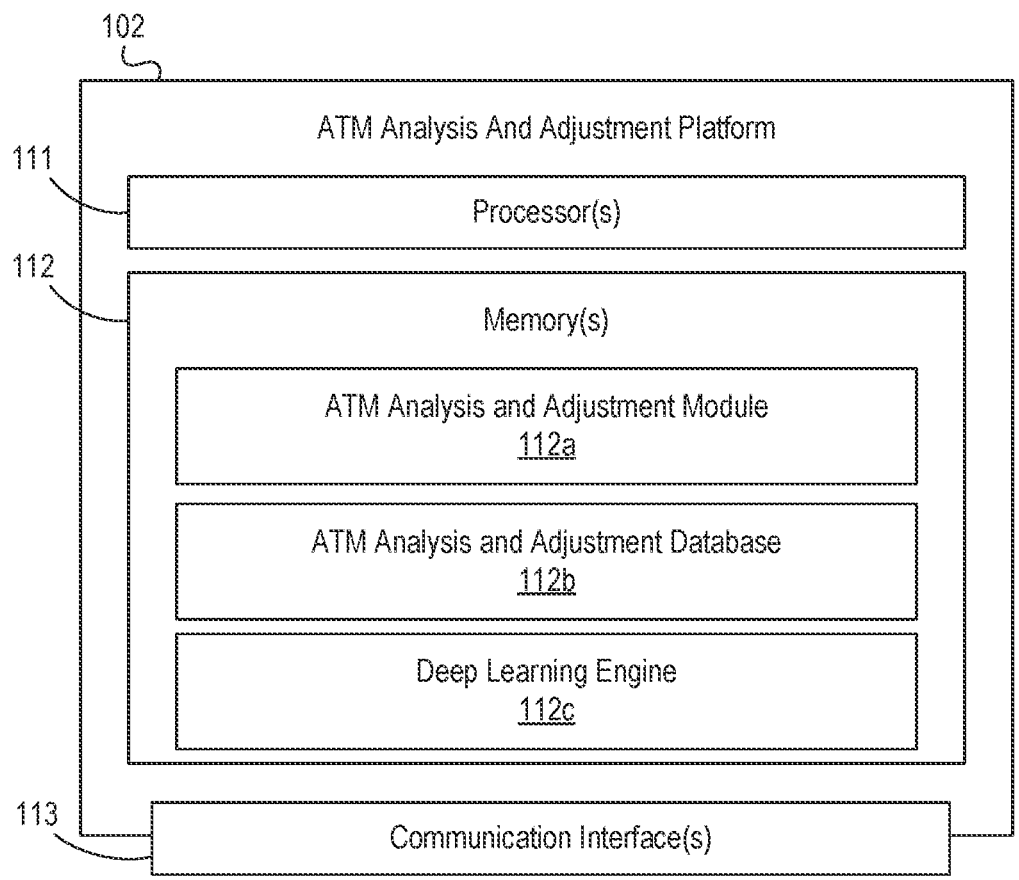

FIGS. 1A-1B depict an illustrative computing environment for automated ATM monitoring and enhancement in accordance with one or more example embodiments. Referring to FIG. 1A, computing environment 100 may include one or more computer systems. For example, computing environment 100 may include ATM analysis and adjustment platform 102, distributed ledger platform 103, ATM 104, administrator computing device 105, and enterprise information storage system 106.

As described further below, ATM analysis and adjustment platform 102 may be a computer system that includes one or more computing devices (e.g., servers, server blades, or the like) and/or other computer components (e.g., processors, memories, communication interfaces) that may be used to monitor and/or otherwise enhance ATMs. For example, the ATM analysis and adjustment platform 102 may be configured to generate digital twins of ATMs, which may have characteristics, parameters, and/or other specifications corresponding to the respective ATMs. The ATM analysis and adjustment platform 102 may use these digital twins to simulate performance of the ATMs. Based on the simulations, the ATM analysis and adjustment platform 102 may generate updated characteristics, parameters, and/or other specifications for the ATMs, which may subsequently be pushed to the ATMs to cause an update.

As described further below, distributed ledger platform 103 may be a computer system that includes one or more computing devices (e.g., servers, server blades, or the like) and/or other computer components (e.g., processors, memories, communication interfaces) that may be used to generate, host, and/or otherwise maintain a distributed ledger (e.g., a blockchain, holochain, and/or other distributed ledger). In some instances, the distributed ledger platform 103 may communicate with the ATM analysis and adjustment platform 102 to validate a proposed ATM update prior to implementing the update at a corresponding ATM.

ATM 104 may be a computing system configured to dispense funds, display account information, and/or otherwise facilitate transactions for a customer. In some instances, the ATM 104 may be located at a different physical location than the ATM analysis and adjustment platform 102. Although a single ATM 104 is shown, this is for illustrative purposes only, and any number of ATMs may be included in the environment 100 without departing from the scope of the disclosure.

Administrator computing device 105 may be a data storing device (e.g., laptop computer, desktop computer, mobile device, tablet, smartphone, server, server blade, and/or other device) and/or other data storing component (e.g., processors, memories, communication interfaces, databases) that may be configured to display security notifications, error interfaces, and/or other interfaces. Additionally or alternatively, administrator computing device 105 may receive user input indicating whether or not to proceed with an ATM update.

Enterprise information storage system 106 may be a computer system that includes one or more computing devices (e.g., servers, server blades, or the like) and/or other computer components (e.g., processors, memories, communication interfaces) that may be used to store historical ATM information. For example, the enterprise information storage system 106 may store electronic component information, software information, firmware information, fault codes, fault logs, incident information, geolocation information, environmental information, transaction volume information, transaction detail information, video information, image information, and/or other information.

Computing environment 100 also may include one or more networks, which may interconnect ATM analysis and adjustment platform 102, distributed ledger platform 103, ATM 104, administrator computing device 105, and/or enterprise information storage system 106. For example, computing environment 100 may include a network 101

(which may interconnect, e.g., ATM analysis and adjustment platform 102, distributed ledger platform 103, ATM 104, administrator computing device 105, and/or enterprise information storage system 106). In some instances, the network 101 may be a 6G data network, and/or other data network.

In one or more arrangements, ATM analysis and adjustment platform 102, distributed ledger platform 103, ATM 104, administrator computing device 105, and/or enterprise information storage system 106 may be any type of computing device capable of sending and/or receiving requests and processing the requests accordingly. For example, ATM analysis and adjustment platform 102, distributed ledger platform 103, ATM 104, administrator computing device 105, enterprise information storage system 106, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of ATM analysis and adjustment platform 102, distributed ledger platform 103, ATM 104, administrator computing device 105, and/or enterprise information storage system 106, may, in some instances, be special-purpose computing devices configured to perform specific functions.

Referring to FIG. 1B, ATM analysis and adjustment platform 102 may include one or more processors (e.g., processor 111), memory 112, and a communication interface (e.g., communication interface 113)). A data bus may interconnect the processor 111, memory 112, and communication interface 113. Communication interface 113 may be a network interface configured to support communication between ATM analysis and adjustment platform 102 and one or more networks (e.g., network 101, or the like). Communication interface 113 may be communicatively coupled to the processor(s) 111. The memory may include one or more program modules having instructions that when executed by processor(s) 111 cause ATM analysis and adjustment platform 102 to perform one or more functions described herein and/or one or more databases that may store and/or otherwise maintain information which may be used by such program modules and/or processor(s) 111. In some instances, the one or more program modules and/or databases may be stored by and/or maintained in different memory units of ATM analysis and adjustment platform 102 and/or by different computing devices that may form and/or otherwise make up ATM analysis and adjustment platform 102. For example, the memory may have, host, store, and/or include ATM analysis and adjustment module 112a, ATM analysis and adjustment database 112b, and/or deep learning engine 112c.

ATM analysis and adjustment module 112a may have instructions that direct and/or cause ATM analysis and adjustment platform 102 to generate ATM digital twins, simulate the ATM digital twins, push updated specifications to physical ATMs, and/or perform other functions. ATM analysis and adjustment database 112b may have instructions and/or data used by ATM analysis and adjustment module 112a, and/or ATM analysis and adjustment platform 102 to perform real time ATM analysis and enhancement accordingly. Deep learning engine 112c may implement, refine, train, maintain, and/or otherwise host an artificial intelligence model that may be used to perform retroactive threshold adjustment.

Figure 2A:
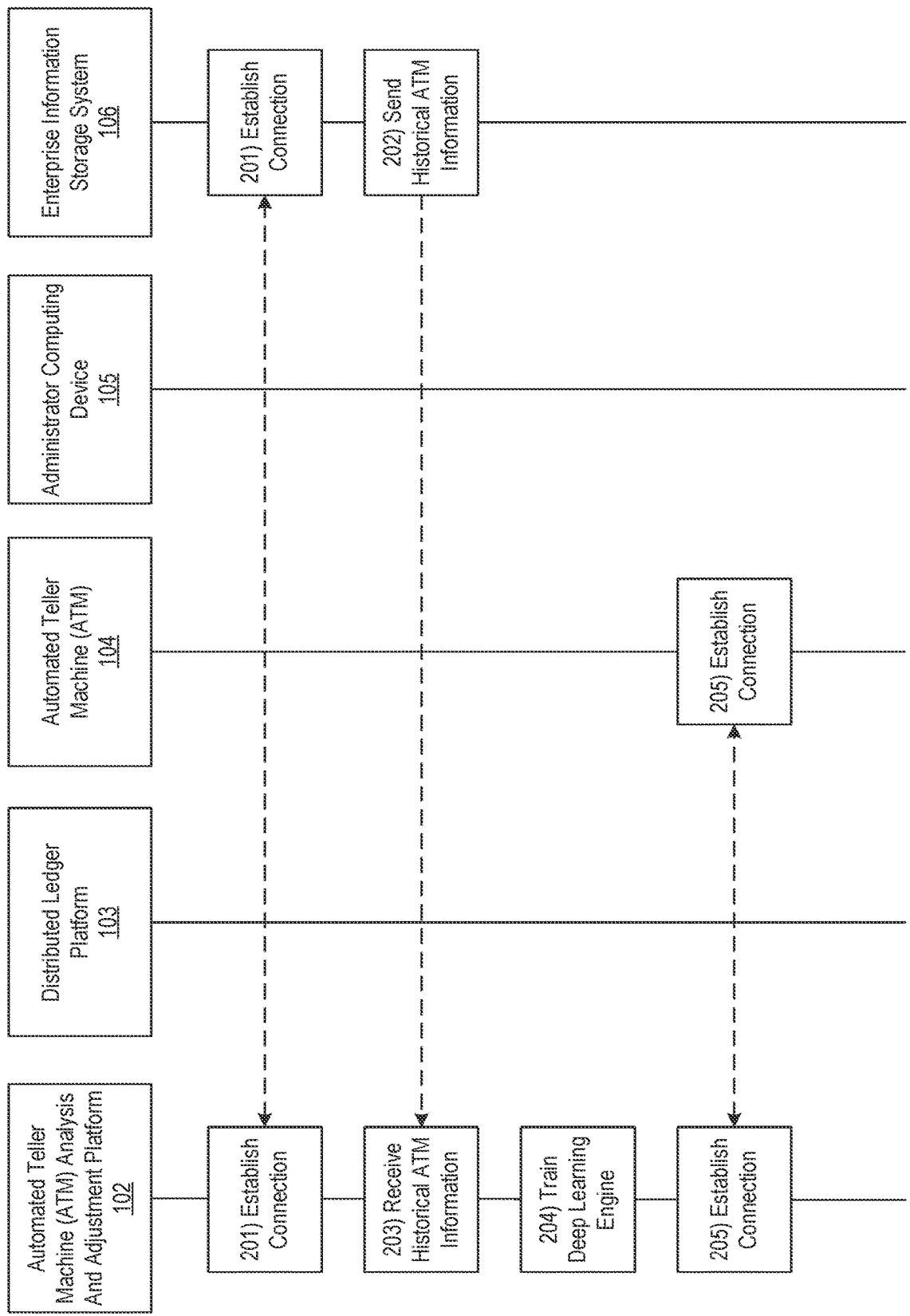
FIGS. 2A-2F depict an illustrative event sequence for automated ATM monitoring and enhancement in accordance with one or more example embodiments.

FIGS. 2A-2F depict an illustrative event sequence for automated ATM monitoring and enhancement in accordance with one or more example embodiments. Referring to FIG. 2A, at step 201, the ATM analysis and adjustment platform 102 may establish a connection with the enterprise information storage system 106. For example, the ATM analysis and adjustment platform 102 may establish a first data connection with the enterprise information storage system 106 to link the ATM analysis and adjustment platform 102 to the enterprise information storage system 106 (e.g., in preparation for requesting and/or otherwise receiving historical ATM information). In some instances, the enterprise information storage system 106 may identify whether or not a connection is already established with the enterprise information storage system 106. If a connection is already established with the enterprise information storage system 106, the ATM analysis and adjustment platform 102 might not re-establish the connection. If a connection is not yet established with the enterprise information storage system 106, the ATM analysis and adjustment platform 102 may establish the first data connection as described herein.

At step 202, the enterprise information storage system 106 may send historical ATM information to the ATM analysis and adjustment platform 102. For example, the enterprise information storage system 106 may send historical ATM information, corresponding to a plurality of ATMs (including the ATM 104), which may be controlled or otherwise affiliated with an enterprise of the ATM analysis and adjustment platform 102 and/or other enterprises. For example, the enterprise information storage system 106 may send electronic component information, software information, firmware information, fault codes, fault logs, incident information, geolocation information, environmental information, transaction volume information, transaction detail information, video information, image information, user information (e.g., user height, or other characteristics), and/or other information that may be used to train a model for ATM anomaly detection. In some instances, the enterprise information storage system 106 may send the historical ATM information to the ATM analysis and adjustment platform 102 while the first data connection is established.

At step 203, the ATM analysis and adjustment platform 102 may receive the historical ATM information sent at step 202. For example, the ATM analysis and adjustment platform 102 may receive the historical ATM information via the communication interface 113 and while the first data connection is established.

At step 204, the ATM analysis and adjustment platform 102 may train a deep learning engine using the historical ATM information. For example, the ATM analysis and adjustment platform 102 may establish baseline values and/or value ranges for ATMs located in various geographical regions (e.g., by computing averages, medians, and/or otherwise). The ATM analysis and adjustment platform 102 may then use these baseline values to train the deep learning engine to output a decision of "anomaly detected" or "no anomaly detected" based on comparison of an ATM information input to the baselines. In some instances, the ATM analysis and adjustment platform 102 may train the deep learning engine to output a decision of "anomaly detected" if an ATM information input value is more than a particular number of standard deviations from the baseline value (e.g., two standard deviations, three standard deviations, or the like).

In some instances, in training the deep learning model, the ATM analysis and adjustment platform 102 may train a supervised learning model. For example, the ATM analysis and adjustment platform 102 may use the historical ATM information, which may be labelled as anomalies/not anomalies, ATM location, and/or otherwise. For example, the ATM analysis and adjustment platform 102 may train an artificial neural network (e.g., LSTM, or the like), decision tree, learning classifier system, nearest neighbor model, support vector machine, random forest model, and/or other supervised learning model.

In some instances, in training the deep learning model, the ATM analysis and adjustment platform 102 may train an unsupervised learning model. For example, the ATM analysis and adjustment platform 102 may use the historical ATM information, which might not be labelled. For example, the ATM analysis and adjustment platform 102 may train a clustering model, anomaly detection model, and/or other unsupervised learning model.

At step 205, the ATM analysis and adjustment platform 102 may establish a connection with the ATM 104. For example, the ATM analysis and adjustment platform 102 may establish a second data connection with the ATM 104 to link the ATM analysis and adjustment platform 102 to the ATM 104 (e.g., in preparation for detecting ATM performance information). In some instances, the ATM analysis and adjustment platform 102 may identify whether a connection is already established with the ATM 104. If a connection is already established with the ATM 104, the ATM analysis and adjustment platform 102 might not re-establish the connection. If a connection is not yet established with the ATM 104, the ATM analysis and adjustment platform 102 may establish the second data connection as described herein.

Figure 2B:
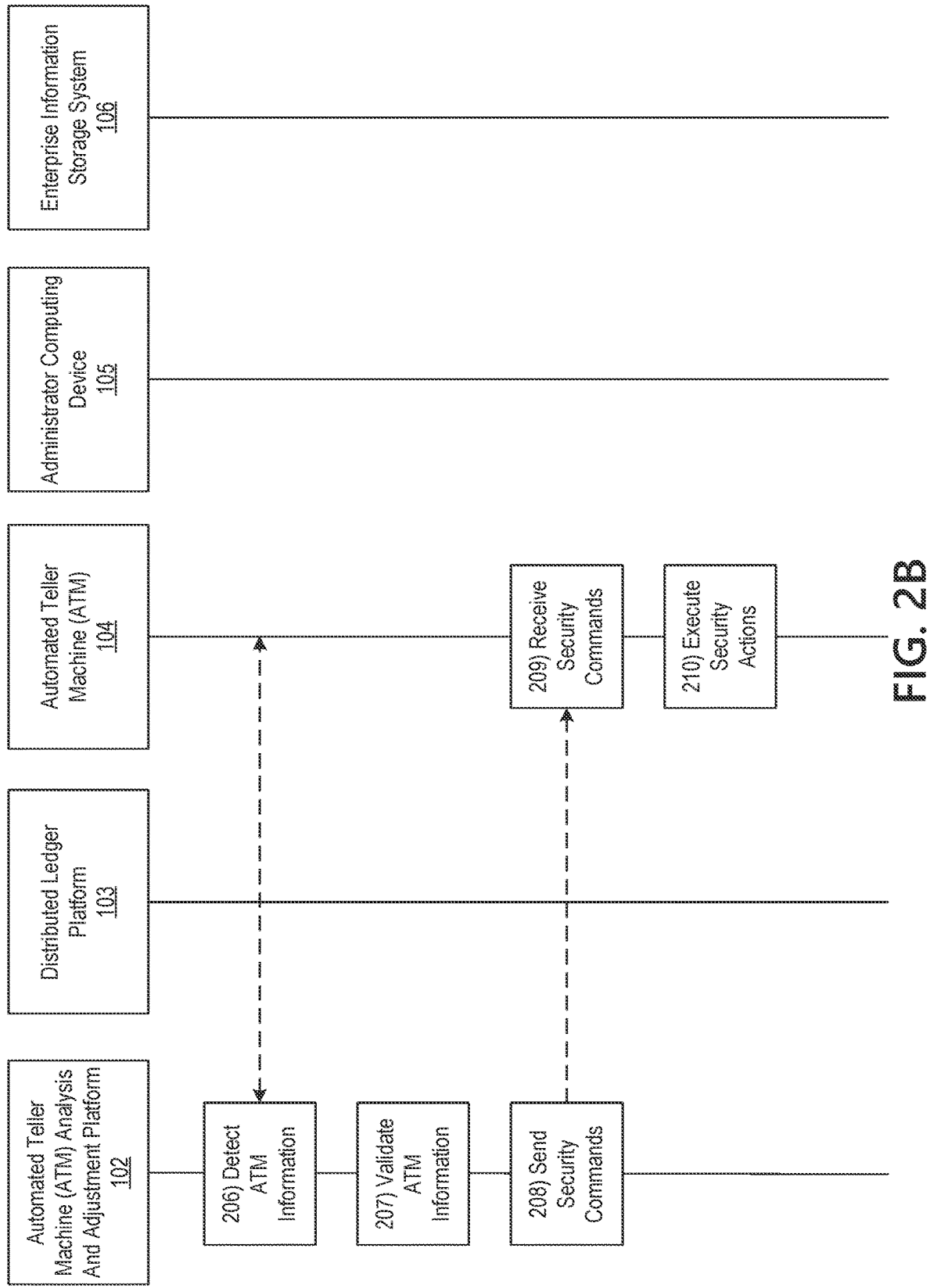

Referring to FIG. 2B, at step 206, the ATM analysis and adjustment platform 102 may monitor the ATM 104 to detect ATM performance information. For example, the ATM analysis and adjustment platform 102 may collect electronic component information, software information, firmware information, fault codes, fault logs, incident information, geolocation information, environmental information, transaction volume information, transaction detail information, video information, image information, user information (e.g., user height, or other characteristics), and/or other information that may be used to analyze performance of the ATM 104. In some instances, the ATM analysis and adjustment platform 102 may receive the image and/or video information from a camera corresponding to the ATM 104, which may, or might not, be integrated into the ATM 104.

At step 207, the ATM analysis and adjustment platform 102 may validate the ATM performance information received at step 206. For example, the ATM analysis and adjustment platform 102 may compare data types of the ATM performance information with anticipated data types (the identities of which may, e.g., be stored at the ATM analysis and adjustment platform 102). Additionally or alternatively, the ATM analysis and adjustment platform 102 may compare sources of the ATM performance information to anticipated sources (e.g., to detect whether a malicious device has been inserted into the ATM 104 and/or the ATM 104 has been otherwise maliciously modified). In doing so, the ATM analysis and adjustment platform 102 may prevent the update of ATM digital twins based on malicious behavior intended to trigger the update and/or otherwise perform malicious activities with regard to the ATM 104. If the ATM analysis and adjustment platform 102 validates the ATM performance information, the computing platform 102 may proceed to step 215. Otherwise, if the ATM analysis and adjustment platform 102 determines that the ATM performance information is not valid, the ATM analysis and adjustment platform 102 may proceed to step 208.

At step 208, the ATM analysis and adjustment platform 102 may send one or more security commands directing the ATM 104 to execute one or more security actions. In some instances, the ATM analysis and adjustment platform 102 may send the one or more security commands to the ATM 104 via the communication interface 113 and while the second wireless connection is established.

At step 209, the ATM 104 may receive the one or more security commands sent at step 208. For example, the ATM 104 may receive the one or more security commands while the second wireless data connection is established.

At step 210, based on or in response to the one or more security commands received at step 209, the ATM 104 may execute one or more ATM security actions. For example, the ATM 104 may prevent funds from being distributed from the ATM 104, distribute an incorrect amount of funds, present one or more interfaces intended to delay distribution of funds from the ATM 104, and/or otherwise prevent/delay the distribution of funds. Additionally or alternatively, the one or more security commands may cause a physical premises in which the ATM 104 is located to be locked or otherwise prevent access to or from the physical premises. Additionally or alternatively, the one or more security commands may cause a visual and/or audio warning message to be played, displayed, and/or otherwise presented (e.g., at the ATM 104 or otherwise within the physical premises).

Figure 2C:
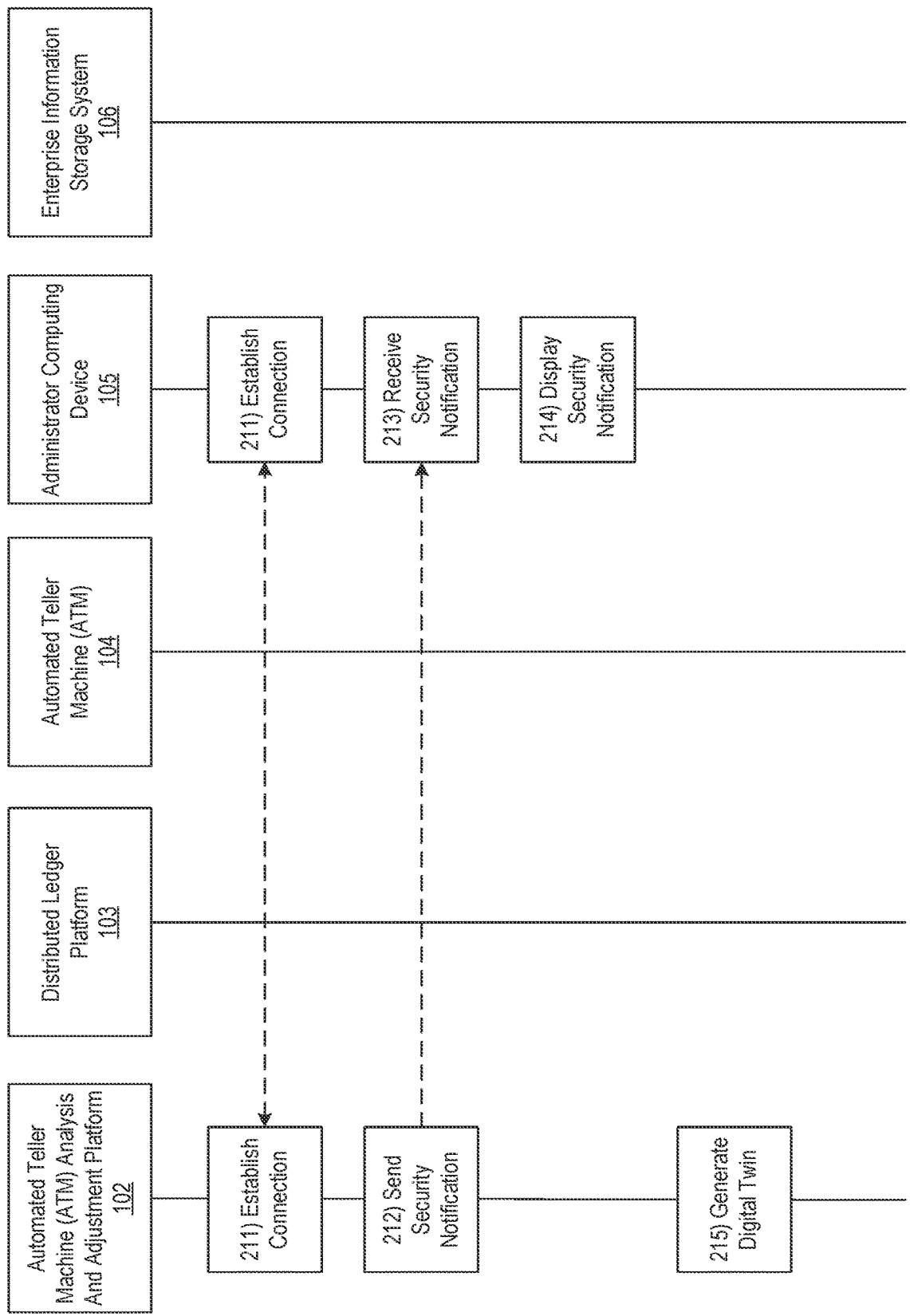

Referring to FIG. 2C, at step 211, the ATM analysis and adjustment platform 102 may establish a connection with the administrator computing device 105. For example, ATM analysis and adjustment platform 102 may establish a third data connection with the administrator computing device 105 to link the ATM analysis and adjustment platform 102 to the administrator computing device (e.g., in preparation for sending a security notification). In some instances, the ATM analysis and adjustment platform 102 may identify whether or not a connection is already established with the administrator computing device 105. If a connection is already established with the administrator computing device 105, the ATM analysis and adjustment platform 102 might not re-establish the connection. If a connection is not yet established with the administrator computing device 105, the ATM analysis and adjustment platform 102 may establish the third data connection as described herein.

At step 212, in addition or as an alternative to the one or more security commands sent at step 208, the ATM analysis and adjustment platform may send a security notification, indicating that the ATM performance information was not validated, to the administrator computing device 105. For example, the ATM analysis and adjustment platform 102 may send the security notification to the administrator computing device 105 via the communication interface 113 and while the third wireless data connection is established. In some instances, the ATM analysis and adjustment platform 102 may also send one or more commands directing the administrator computing device 105 to display the security notification.

At step 213, the administrator computing device 105 may receive the security notification sent at step 212. For example, the administrator computing device 105 may receive the security notification while the third data connection is established. In some instances, the administrator computing device 105 may also receive the one or more commands directing the administrator computing device 105 to display the security notification.

At step 214, based on or in response to the one or more commands, the administrator computing device 105 may display the security notification. For example, the administrator computing device 105 may display a graphical user interface similar to graphical user interface 405, which is shown in FIG. 4, and which may indicate that malicious behavior has been detected (e.g., such as one or more actions taking to provoke the update of a digital twin for the ATM 104).

At step 215, the ATM analysis and adjustment platform 102 may generate a digital twin for the ATM 104. For example, the ATM analysis and adjustment platform 102 may generate a digital version of the ATM 104, which may, e.g., include the same specifications, parameters, features, and/or otherwise match performance of the ATM 104. In some instances, the ATM analysis and adjustment platform 102 may secure the digital twin with a non-fungible token (NFT) e.g., at a distributed ledger (e.g., which may be hosted by the distributed ledger platform 103). In these instances, the NFT may indicate specific ATM locations, conditions, personal, and/or other ATM information to which the digital twin may apply.

Figure 2D:
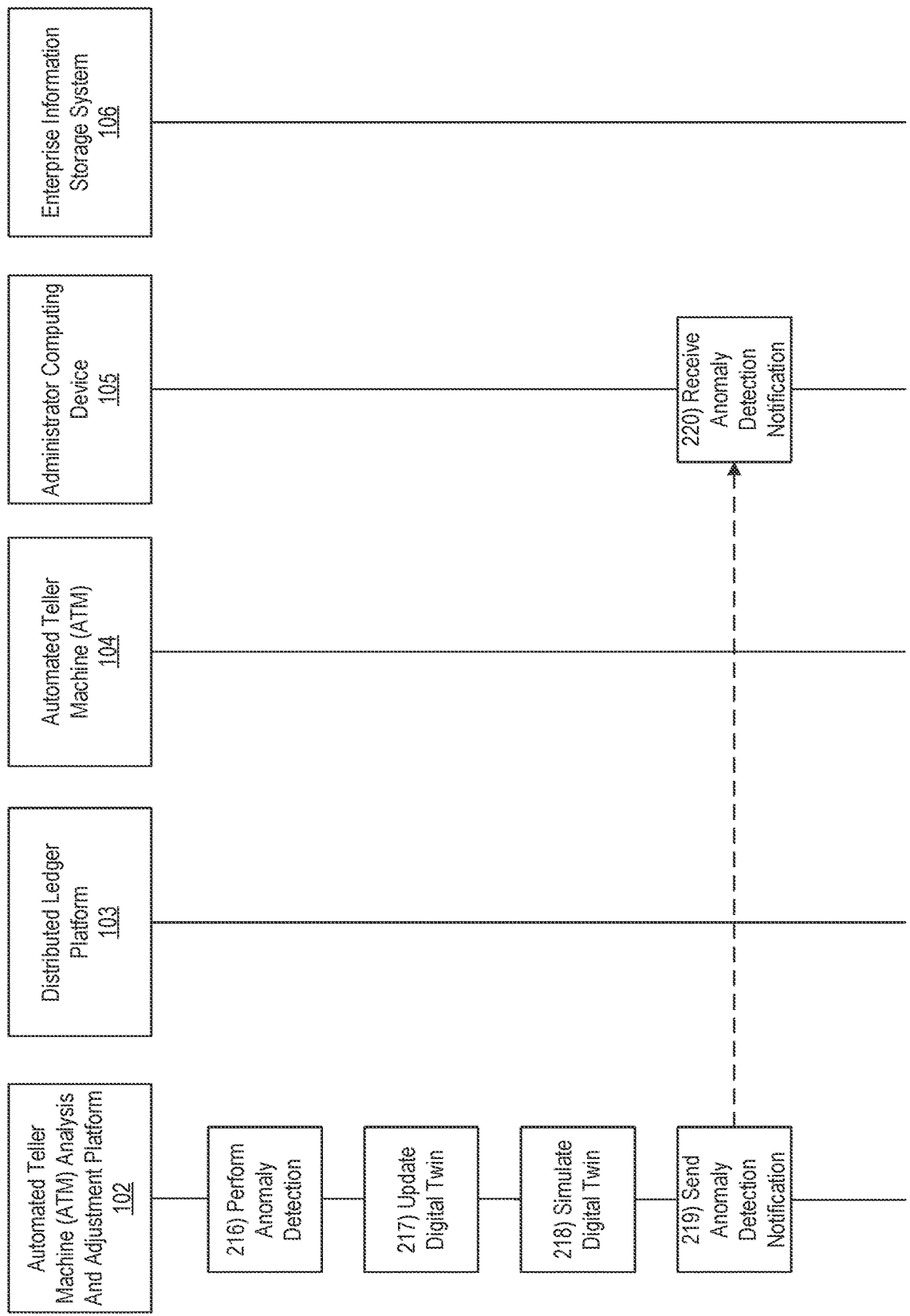

Referring to FIG. 2D, at step 216, ATM analysis and adjustment platform 102 may input the ATM performance information into the deep learning engine, which may analyze the ATM performance information to detect any anomalies. For example, the ATM analysis and adjustment platform 102 may use the deep learning engine to compare the ATM performance information to the baseline values and/or value ranges for a geographic region corresponding to the ATM 104 to output whether or not an anomaly is detected. In some instances, the ATM analysis and adjustment platform 102 may use the deep learning engine to identify whether values of the ATM performance information exceed a predetermined number of standard deviations (e.g., two, or the like) from the corresponding baseline value. For example, the ATM analysis and adjustment platform 102 may use the deep learning engine to detect anomalies in one or more of: electronic component information, software information, firmware information, fault codes, fault logs, incident information, system latency information, geolocation information, environmental information (e.g., wind, lightning, or other weather events), transaction volume information, transaction detail information (e.g., transaction values, transaction success/failure rates, and/or other information), video information (e.g., identifying an individual installing a chip or otherwise maliciously modifying the ATM 104), image information (e.g., identifying an individual installing a chip or otherwise maliciously modifying the ATM 104), user information (e.g., user height, or other characteristics), and/or other information.

In some instances, in detecting the one or more anomalies, the ATM analysis and adjustment platform 102 may identify anomalies in real time, and/or in a predictive manner. For example, the ATM analysis and adjustment platform 102 may, in some instances, predict anomalies before they happen (e.g., predicting failure due to deterioration or otherwise, predicting weather events that may affect the ATM 104, and/or otherwise).

In some instances, the ATM analysis and adjustment platform 102 may detect one or more anomalies. In these instances, the ATM analysis and adjustment platform 102 may proceed to step 217. Otherwise, if no anomalies are detected by the ATM analysis and adjustment platform 102, the ATM analysis and adjustment platform 102 may proceed to step 229.

At step 217, the ATM analysis and adjustment platform 102 may update the digital twin for the ATM 104 (e.g., generated at step 215) to account for any anomalies detected at step 216. For example, the ATM analysis and adjustment platform 102 may push a software update, a firmware update, and/or otherwise cause an update to the specification, configuration, and/or parameters of the digital twin to account for any detected anomalies.

At step 218, the ATM analysis and adjustment platform 102 may simulate the updated digital twin for the ATM 104. For example, the ATM analysis and adjustment platform 102 may run a software simulation to test the updated specification, configuration, parameters, and/or other information of the ATM 104 prior to pushing or otherwise causing any updates to the ATM 104 itself.

In some instances, the simulation of the updated digital twin may result in one or more errors (e.g., failed to correct the anomaly, failed to execute, or otherwise). In these instances, the ATM analysis and adjustment platform 102 may proceed to step 219. Otherwise, if no errors are detected, the ATM analysis and adjustment platform 102 may proceed to step 222.

At step 219, the ATM analysis and adjustment platform 102 may send an anomaly detection notification (e.g., indicating any detected anomalies) to the administrator computing device 105. For example, the ATM analysis and adjustment platform 102 may send the anomaly detection notification to the administrator computing device 105 via the communication interface 113 and while the third data connection is established. In some instances, the ATM analysis and adjustment platform 102 may also send one or more commands directing the administrator computing device 105 to display the anomaly detection notification.

At step 220, the administrator computing device 105 may receive the anomaly detection notification. For example, the administrator computing device 105 may receive the anomaly detection notification while the third data connection is established. In some instances, the administrator computing device 105 may also receive the one or more commands directing the administrator computing device 105 to display the anomaly detection notification.

Figure 2E:
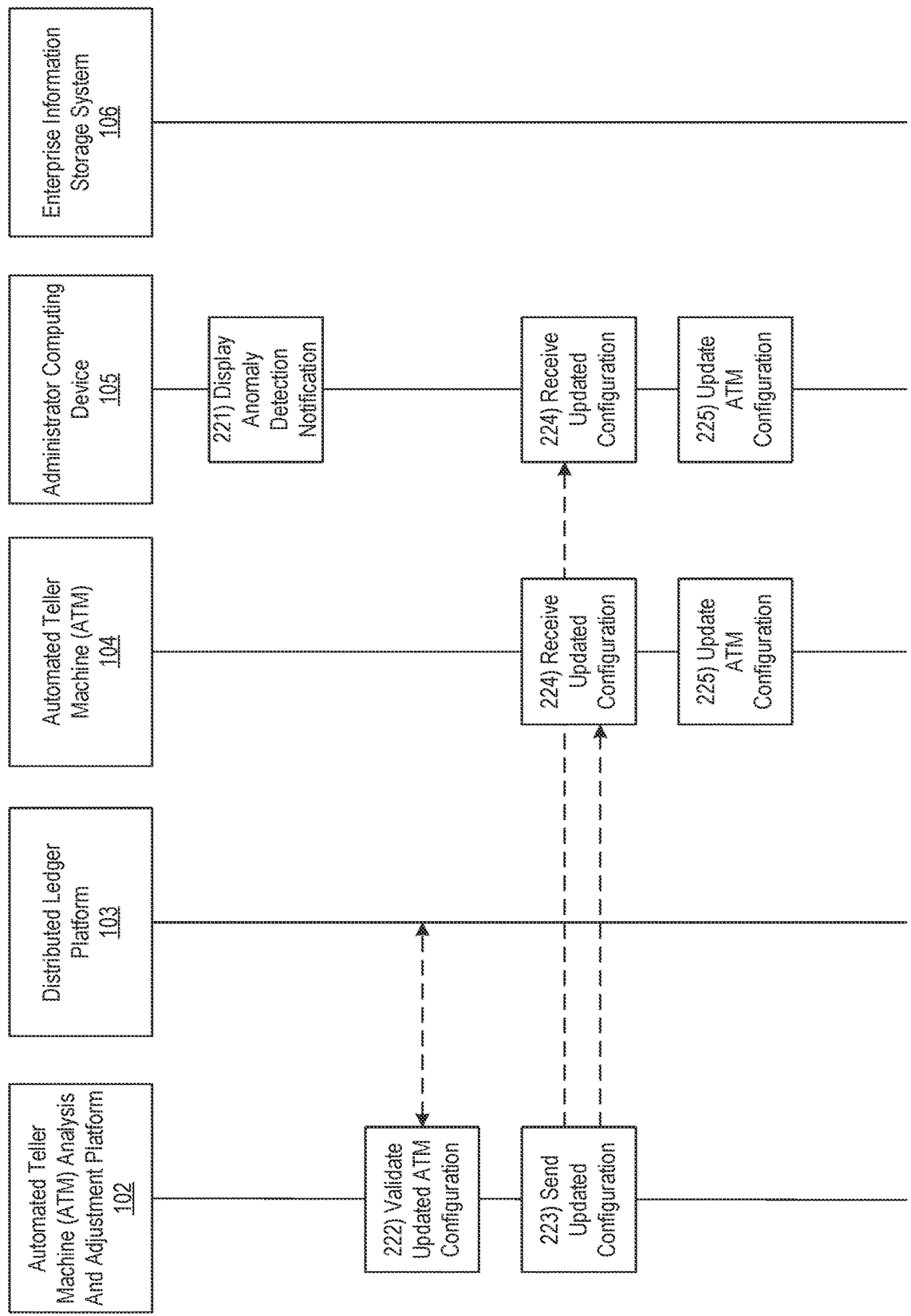

Referring to FIG. 2E, at step 221, based on or in response to the one or more commands directing the administrator computing device 105 to display the anomaly detection notification, the administrator computing device 105 may display a graphical user interface similar to graphical user interface 505, which is shown in FIG. 5, and which may indicate the detected anomalies and that one or more errors have been identified.

At step 222, the ATM analysis and adjustment platform 102 may validate an ATM configuration, specification, parameters, or the like of the updated digital twin. For example, the ATM analysis and adjustment platform 102 may obtain consent to push the ATM configuration, specification, parameters, or the like of the updated digital twin to the ATM 104. In some instances, to do so, the ATM analysis and adjustment platform 102 may communicate with the distributed ledger platform 103. For example, the ATM analysis and adjustment platform 102 and/or the distributed ledger platform 103 may consult a distributed ledger such as a blockchain, holo-chain, and/or other ledger to validate the configuration. In some instances, the distributed ledger may include one or more smart contracts, which may include rules for automated configuration validation. For example, if the ATM analysis and adjustment platform 102 and/or distributed ledger platform 103 determines that the one or more smart contracts are satisfied, the ATM analysis and adjustment platform and/or distributed ledger platform 103 may automatically approve the configuration (and may proceed to step 223). Alternatively, if the ATM analysis and adjustment platform 102 and/or the distributed ledger platform 103 determine that one or more smart contracts are not satisfied, the ATM analysis and adjustment platform 102 and/or distributed ledger platform 103 may proceed to step 226. In either instance, the ATM analysis and adjustment platform 102 and/or the distributed ledger platform 103 may modify or otherwise update the distributed ledger to indicate the validation decision (e.g., add a new block/node to the distributed ledger indicating whether or not the configuration was validated).

For example, the one or more smart contracts may include electronic component information (e.g., performance values of the electronic components of the ATM 104), software information (e.g., performance values of the software running at the ATM 104), firmware information (e.g., acceptable versus non-acceptable firmware), fault codes, fault logs, incident information, system latency information, geolocation information, environmental information (e.g., wind, lightning, or other weather events), transaction volume information, transaction detail information (e.g., transaction values, transaction success/failure rates, and/or other information), video information (e.g., identifying an individual installing a chip or otherwise maliciously modifying the ATM 104), image information (e.g., identifying an individual installing a chip or otherwise maliciously modifying the ATM 104), user information (e.g., user height, or other characteristics), and/or other information. In these instances, the one or more smart contracts may be satisfied if the features of the configuration (as noted above) comply with the parameters noted in the one or more smart contracts.

In some instances, the ATM analysis and adjustment platform 102 and/or distributed ledger platform 103 may use an NFT corresponding to the digital twin to validate the proposed configuration (e.g., should this configuration be applied to ATMs in the corresponding location, for use with the corresponding personnel, and/or otherwise).

In some instances, in maintaining the distributed ledger, the distributed ledger platform 103 may maintain one or more private chains for each of a plurality of validators/validating systems of the distributed ledger, which may, e.g., be suppliers, departments, functions, and/or other approvers of an enterprise organization of the ATM analysis and adjustment platform 102. In these instances, the distributed ledger platform 103 may maintain a distributed hash table linked to these private source chains.

At step 223, the ATM analysis and adjustment platform 102 may send the updated configuration, specification, parameters, or the like of the updated ATM digital twin (e.g., validated at step 222) to the ATM 104 itself and/or the administrator computing device 105 (e.g., in instances where the ATM 104 is not configured to automatically perform the corresponding update). For example, the detected anomaly may be in height of the ATM 104 in view of the average height of users of the ATM, and thus the updated configuration may be a change in height of the ATM 104. In this example, the ATM analysis and adjustment platform 102 may notify the administrator computing device 105 of the change rather than the ATM 104 itself (e.g., because the ATM 104 might not independently perform this update). For example, the ATM analysis and adjustment platform 102 may send the updated configuration to the ATM 104 and/or the administrator computing device 105 via the communication interface 113 and while the second and/or third data connections are established. In some instances, the ATM analysis and adjustment platform 102 may send one or more commands directing the ATM 104 to perform an update (e.g., a software update, or the like) based on the updated configuration and/or directing the administrator computing device 105 to display the update (e.g., a firmware or other physical update to the ATM 104).

In some instances, in addition to sending the updated configuration to the ATM 104, the ATM analysis and adjustment platform 102 may also send the updated configuration to other similarly situated ATMs. In some instances, these similarly situated ATMs may be identified using the distributed ledger and/or corresponding NFTs, which may, e.g., indicate ATMs located in a particular geographic region, having the same software and/or hardware, similar transaction volume, and/or otherwise. In these instances, the ATM analysis and adjustment platform 102 may cause these other ATMs to update as described below at step 225 with regard to the ATM 104.

At step 224, the ATM 104 and/or the administrator computing device 105 may receive the updated configuration (or a notification of the updated configuration) sent at step 223. For example, the ATM 104 and/or the administrator computing device 105 may receive the updated configuration and/or a notification of the updated configuration while the second and/or third data connections are established. In some instances, the ATM 104 and/or the administrator computing device 105 may also receive the one or more commands directing the ATM 104 to perform an update (e.g., a software update, or the like) based on the updated configuration and/or directing the administrator computing device 105 to display the update (e.g., a firmware or other physical update to the ATM 104).

At step 225, based on or in response to the one or more commands directing the ATM 104 to perform an update (e.g., a software update, or the like) based on the updated configuration, the ATM 104 may automatically update a configuration, specification, parameters, and/or other information of the ATM 104 based on the updated configuration received at step 224. Additionally or alternatively, based on or in response to the one or more commands directing the administrator computing device 105 to display the update (e.g., a firmware or other physical update to the ATM 104), the administrator computing device 105 may display a notification of the updated configuration, specification, parameters, and/or other information of the ATM 104. For example, the administrator computing device 105 may display a graphical user interface indicating an update to be performed to the ATM 104 (which may, e.g., initiate performance of the update). The ATM analysis and adjustment platform 102 may then proceed to step 229.

Figure 2F:
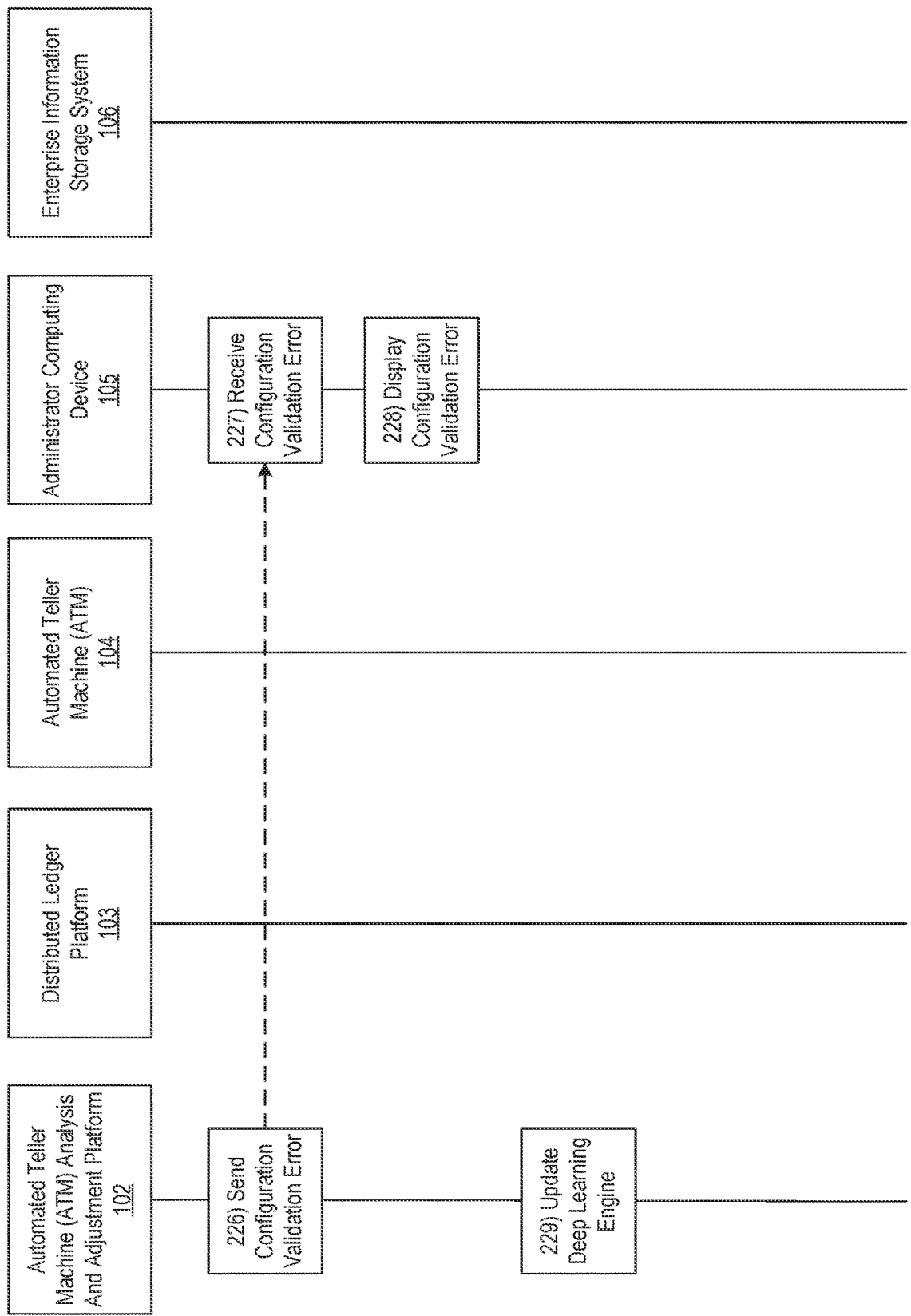

Referring to FIG. 2F, at step 226, the ATM analysis and adjustment platform 102, the ATM analysis and adjustment platform 102 may send a configuration validation error notification to the administrator computing device 105. For example, the ATM analysis and adjustment platform 102 may send the configuration validation error notification to the administrator computing device 105 via the communication interface 113 and while the third data connection is established. In some instances, the ATM analysis and adjustment platform 102 may also send one or more commands directing the administrator computing device 105 to display the configuration validation error notification.

At step 227, the administrator computing device 105 may receive the configuration validation error notification sent at step 226. For example, the administrator computing device 105 may receive the configuration validation error while the third data connection is established. In some instances, the administrator computing device 105 may also receive the one or more commands directing the administrator computing device 105 to display the configuration validation error notification.

Figure 6:
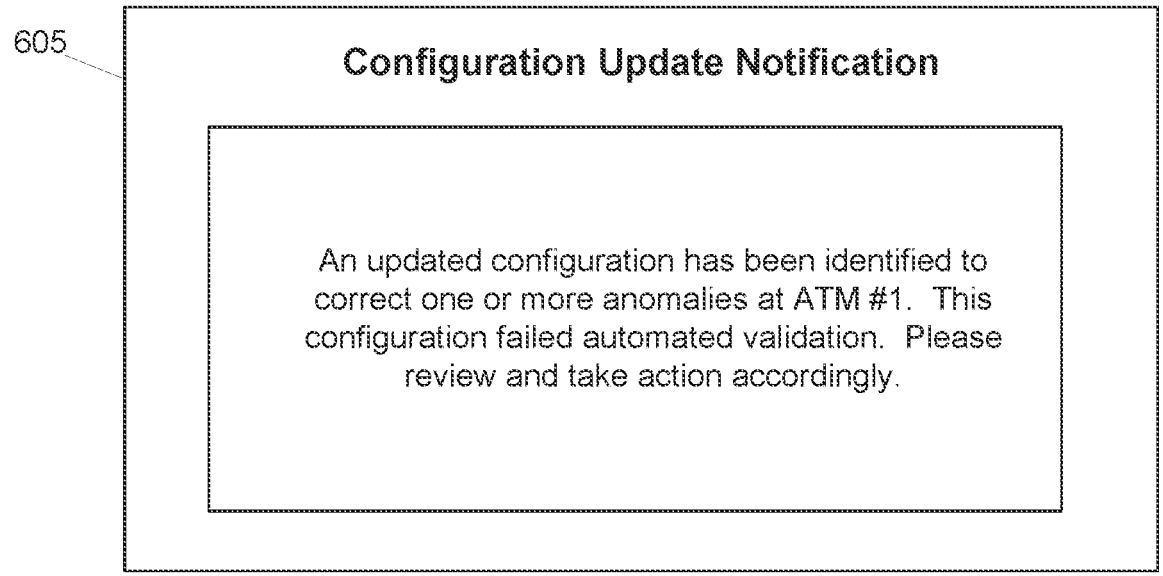

At step 228, based on or in response to the one or more commands directing the administrator computing device 105 to display the configuration validation error notification, the administrator computing device 105 may display the configuration validation error. For example, the administrator computing device 105 may display a graphical user interface similar to graphical user interface 605, which is shown in FIG. 6, and which may prompt for manual approval of the configuration update. If manual approval is received, the ATM analysis and adjustment platform 102 may return to 223. Otherwise, if manual approval is not received, the ATM analysis and adjustment platform may proceed to step 229.

At step 229, the ATM analysis and adjustment platform 102 may update the deep learning engine. For example, the ATM analysis and adjustment platform 102 may input results of the anomaly detection performed at step 216 back into the deep learning engine, so as to establish a dynamic feedback loop that continuously improves accuracy of the deep learning engine by inputting results of the engine for further training.

Although the above described event sequence primarily describes the use case of monitoring and updating ATM devices, these methods may be used for the monitoring and/or updating of any other computing devices (e.g., other self service kiosks and/or other computing devices) without departing from the scope of the disclosure. Furthermore, other notifications/messages may be sent to the administrator computing device 105 based on the above described analysis (e.g., email summary alerts, on demand dashboards (which may, e.g., include ATM location maps and/or other information), or the like), without departing from the scope of the disclosure.

Accordingly, described above is a method for 1) monitoring digital twin development leveraging blockchain, holochain, and/or NFT technology, 2) intelligent validation of communications initiated by an ATM or digital twin, and 3) automated identification of unauthorized changes to an ATM.

Figure 3:
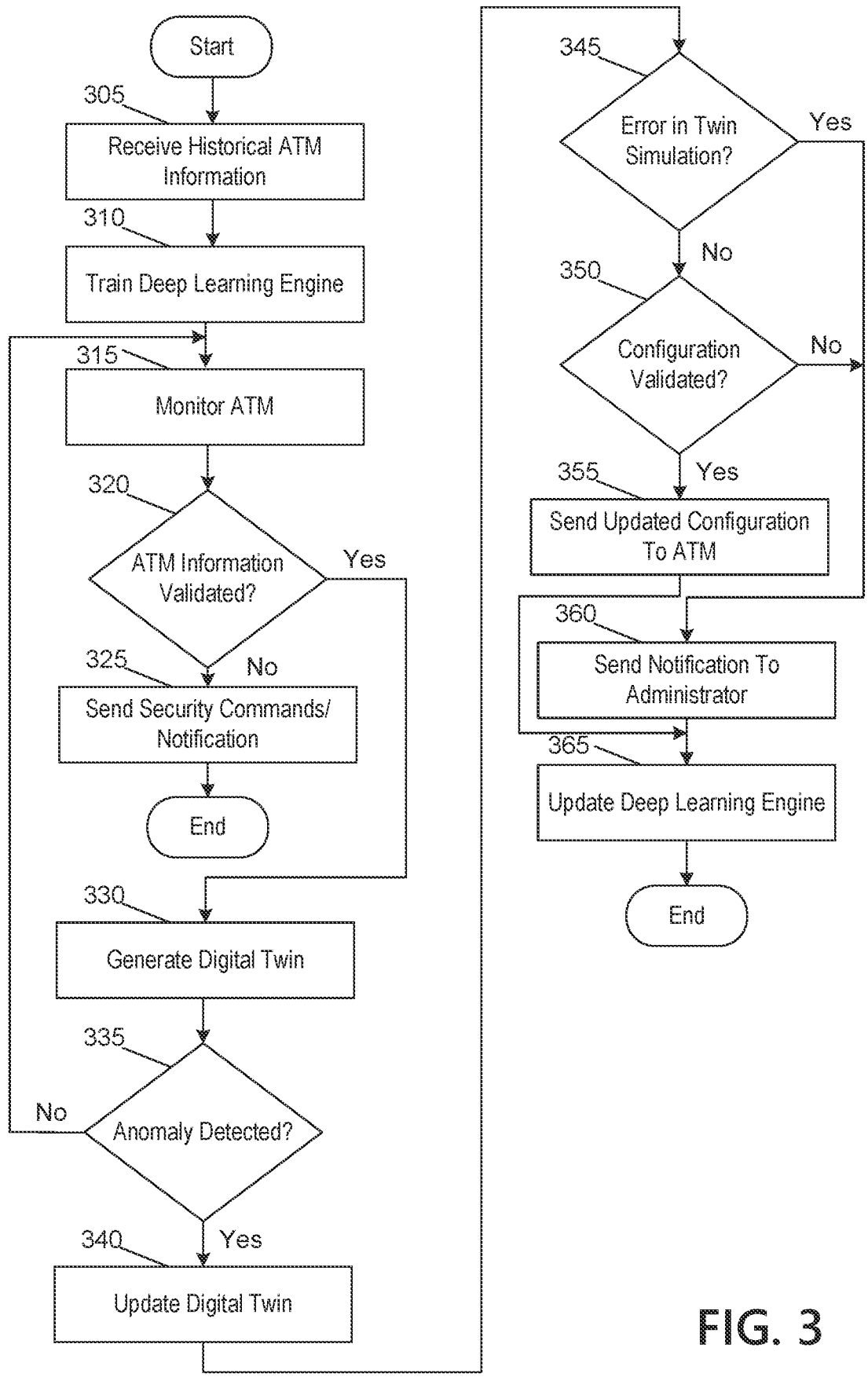
FIG. 3 depicts an illustrative method for automated ATM monitoring and enhancement in accordance with one or more example embodiments.

FIG. 3 depicts an illustrative method for automated ATM monitoring and enhancement in accordance with one or more example embodiments. Referring to FIG. 3, at step 305, a computing platform having at least one processor, a communication interface, and memory may receive historical ATM information. At step 310, the computing platform may train a deep learning engine using the historical ATM information. At step 315, the computing platform may monitor an ATM to detect ATM performance information. At step 320, the computing platform may identify whether or not the ATM performance information is validated. If the ATM performance information is not validated, the computing platform may proceed to step 325. If the ATM performance information is validated, the computing platform may proceed to step 330.

At step 325, the computing platform may send one or more security commands directing the ATM to perform one or more security actions and/or a security notification for display at an administrator computing device.

At step 330, the computing platform may generate a digital twin for the ATM. At step 335, the computing platform may determine whether or not an anomaly is detected in the ATM performance information. If no anomaly is detected, the computing platform may proceed to step 315. If an anomaly is detected, the computing platform may proceed to step 340.

At step 340, the computing platform may update the digital twin based on the anomaly. At step 345, the computing platform may simulate the digital twin and identify whether or not there is an error in the simulation. If the simulation does not result in an error, the computing platform may proceed to step 350. If the simulation does result in an error, the computing platform may proceed to step 360.

At step 350, the computing platform may determine whether or not the configuration of the updated digital twin is validated. If the configuration is not valid, the computing platform may proceed to step 360. If the configuration is valid, the computing platform may proceed to step 355.

At step 355, the computing platform may send the updated configuration to the ATM. At step 360, the computing platform may send a notification (e.g., of the simulation and/or validation errors) to the administrator computing device for display. At step 365, the computing platform may update the deep learning engine.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:
   at least one processor;
   a communication interface communicatively coupled to the at least one processor; and
   memory storing computer-readable instructions that, when executed by the processor, cause the computing platform to:
   detect automated teller machine (ATM) performance information from a first ATM;
   validate the ATM performance information against baseline ATM performance information;
   based on validating the ATM performance information, generate a simulated version of the first ATM;
   compare the ATM performance information to corresponding baseline values of the ATM performance information, wherein:
      the corresponding baseline values are specific to a geographic region corresponding to the first ATM,
      the comparison comprises identifying whether or not the ATM performance information exceeds a predetermined number of standard deviations from the corresponding baseline values,
      identifying that the ATM performance information exceeds the predetermined number of standard deviations from the corresponding baseline values indicates one or more anomalies, and
      the one or more anomalies comprise anomalies in one or more of: electronic component information, software information, firmware information, fault codes, fault logs, incident information, geolocation information, environmental information, transaction volume information, transaction detail information, video information, and image information;
   based on identifying that the simulated version of the first ATM includes the one or more anomalies, update the simulated version of the first ATM to compensate for the one or more anomalies, wherein updating the simulated version of the first ATM comprises pushing a software update to a configuration of the simulated version of the first ATM;
   execute a simulation of the updated simulated version of the first ATM, wherein the execution of the simulation results in one of: an error or a successful simulation;
   determine, using one or more smart contracts stored on a distributed ledger, whether or not an update to the first ATM based on the updated simulated version of the first ATM is approved; and
   based on determining that the update to the first ATM is approved, send one or more commands directing the first ATM to perform a configuration update based on the updated simulated version of the first ATM, wherein sending the one or more commands directing the first ATM to perform the configuration update based on the updated simulated version of the first ATM causes the first ATM to perform the configuration update.

2. The computing platform of claim 1, wherein the memory stores additional computer-readable instructions that, when executed by the processor, further cause the computing platform to:
   based on determining that the ATM performance information is not validated, send one or more ATM security commands to the first ATM, wherein sending the one or more ATM security commands to the first ATM causes the first ATM to prevent distribution of currency.

3. The computing platform of claim 2, wherein the memory stores additional computer-readable instructions that, when executed by the processor, further cause the computing platform to:
   determine that the ATM performance information is not validated based on detecting one or more of: information from an unanticipated device, or information of an unanticipated information type.

4. The computing platform of claim 1, based on identifying that the simulated version of the first ATM does not include the one or more anomalies, continuing to monitor the first ATM.

5. The computing platform of claim 1, wherein the comparison is performed using a deep learning model, and wherein the deep learning model comprises a long short-term memory (LSTM) recurrent neural network (RNN).

6. The computing platform of claim 1, wherein the memory stores additional computer-readable instructions that, when executed by the processor, further cause the computing platform to:
   based on detecting that the simulation resulted in error, sending an error notification and one or more commands directing an administrator device to display the error notification, wherein sending the one or more commands directing the administrator device to display the error notification causes the administrator device to display the error notification.

7. The computing platform of claim 1, wherein determining whether or not the update to the first ATM based on the updated simulated version of the first ATM is approved comprises automatically identifying whether one or more rules of the one or more smart contracts are satisfied.

8. The computing platform of claim 1, wherein the memory stores additional computer-readable instructions that, when executed by the processor, further cause the computing platform to:
   based on determining that the update to the first ATM is not approved, sending an authorization prompt and one or more commands directing an administrator device to display the authorization prompt, wherein sending the one or more commands directing the administrator device to display the authorization prompt causes the administrator device to display the authorization prompt.

9. The computing platform of claim 1, wherein the memory stores additional computer-readable instructions that, when executed by the processor, further cause the computing platform to:
   train, using historical ATM performance information, a deep learning model used to perform the comparison; and
   update, based on the identified one or more anomalies, the deep learning model.

10. The computing platform of claim 9, wherein the historical ATM performance information and the ATM performance information include one or more of: the electronic component information, the software information, the firmware information, the fault codes, the fault logs, the incident information, the geolocation information, the environmental information, the transaction volume information, the transaction detail information, the video information, and the image information.

11. The computing platform of claim 1, wherein detecting the one or more anomalies comprises detecting that a height of the first ATM should be adjusted, and wherein the computing platform is further configured to send a height adjustment notification to an administrator device.

12. A method comprising:
   at a computing device comprising at least one processor, a communication interface, and memory:
      detecting automated teller machine (ATM) performance information from a first ATM;
      validating the ATM performance information against baseline ATM performance information;
      based on validating the ATM performance information, generating a a simulated version of the first ATM;
      comparing the ATM performance information to corresponding baseline values of the ATM performance information, wherein:
         the corresponding baseline values are specific to a geographic region corresponding to the first ATM,
         the comparison comprises identifying whether or not the ATM performance information exceeds a predetermined number of standard deviations from the corresponding baseline values,
         identifying that the ATM performance information exceeds the predetermined number of standard deviations from the corresponding baseline values indicates one or more anomalies, and
         the one or more anomalies comprise anomalies in one or more of: electronic component information, software information, firmware information, fault codes, fault logs, incident information, geolocation information, environmental information, transaction volume information, transaction detail information, video information, and image information;
      based on identifying that the simulated version of the first ATM includes the one or more anomalies, updating the simulated version of the first ATM to compensate for the one or more anomalies, wherein updating the simulated version of the first ATM comprises pushing a software update to a configuration of the simulated version of the first ATM;
      executing a simulation of the updated simulated version of the first ATM, wherein the execution of the simulation results in an error or a successful simulation;
      determining, using one or more smart contracts stored on a distributed ledger, whether or not an update to the first ATM based on the updated simulated version of the first ATM is approved; and
      based on determining that the update to the first ATM is approved, sending one or more commands directing the first ATM to perform a configuration update based on the updated simulated version of the first ATM, wherein sending the one or more commands directing the first ATM to perform the configuration update based on the updated simulated version of the first ATM causes the first ATM to perform the configuration update.

13. The method of claim 12, further comprising:
   based on determining that the ATM performance information is not validated, sending one or more ATM security commands to the first ATM, wherein sending the one or more ATM security commands to the first ATM cause the first ATM to prevent distribution of currency.

14. The method of claim 13, further comprising:
   determining that the ATM performance information is not validated based on detecting one or more of: information from an unanticipated device, or information of an unanticipated information type.

15. The method of claim 12, based on identifying that the simulated version of the first ATM does not include the one or more anomalies, continuing to monitor the first ATM.

16. The method of claim 12, wherein the comparison is performed using a deep learning model, and wherein the deep learning model comprises a long short-term memory (LSTM) recurrent neural network (RNN).

17. The method of claim 12, further comprising:
   based on detecting that the simulation resulted in error, sending an error notification and one or more commands directing an administrator device to display the error notification, wherein sending the one or more commands directing the administrator device to display the error notification causes the administrator device to display the error notification.

18. One or more non-transitory computer-readable media storing instructions that, when executed by a computing device comprising at least one processor, a communication interface, and memory, cause the computing device to:
   detect automated teller machine (ATM) performance information from a first ATM;
   validate the ATM performance information against baseline ATM performance information;
   based on validating the ATM performance information, generate a simulated version of the first ATM;
   compare the ATM performance information to corresponding baseline values of the ATM performance information, wherein:
      the corresponding baseline values are specific to a geographic region corresponding to the first ATM,
      the comparison comprises identifying whether or not the ATM performance information exceeds a predetermined number of standard deviations from the corresponding baseline values,
      identifying that the ATM performance information exceeds the predetermined number of standard deviations from the corresponding baseline values indicates one or more anomalies, and
      the one or more anomalies comprise anomalies in one or more of: electronic component information, software information, firmware information, fault codes, fault logs, incident information, geolocation information, environmental information, transaction volume information, transaction detail information, video information, and image information;

based on identifying that the simulated version of the first ATM includes the one or more anomalies, update the simulated version of the first ATM to compensate for the one or more anomalies, wherein updating the simulated version of the first ATM comprises pushing a software update to a configuration of the simulated version of the first ATM;

execute a simulation of the updated simulated version of the first ATM, wherein the execution of the simulation results in an error or a successful simulation;

determine, using one or more smart contracts stored on a distributed ledger, whether or not an update to the first ATM based on the updated simulated version of the first ATM is approved; and based on determining that the update to the first ATM is approved, send one or more commands directing the first ATM to perform a configuration update based on the updated simulated version of the first ATM, wherein sending the one or more commands directing the first ATM to perform the configuration update based on the updated simulated version of the first ATM causes the first ATM to perform the configuration update.

19. The one or more non-transitory computer-readable media of claim 18, wherein the memory stores additional computer-readable instructions that, when executed by the at least one processor, further cause the computing device to:

based on determining that the ATM performance information is not validated, send one or more ATM security commands to the first ATM, wherein sending the one or more ATM security commands to the first ATM causes the first ATM to prevent distribution of currency.

20. The one or more non-transitory computer-readable media of claim 19, wherein the memory stores additional computer-readable instructions that, when executed by the at least one processor, further cause the computing device to:

determine that the ATM performance information is not validated based on detecting one or more of: information from an unanticipated device, or information of an unanticipated information type.

\* \* \* \* \*

UNITED STATES PATENT AND TRADEMARK OFFICE
CERTIFICATE OF CORRECTION

| | | |
|---|---|---|
| PATENT NO. | : 11,769,379 B1 | |
| APPLICATION NO. | : 17/708571 | |
| DATED | : September 26, 2023 | |
| INVENTOR(S) | : Shailendra Singh et al. | |

It is certified that error appears in the above-identified patent and that said Letters Patent is hereby corrected as shown below:

In the Claims

Column 17, Line 33:
In Claim 12, delete "a a" and insert --a-- therefor

Signed and Sealed this
Tenth Day of September, 2024

Katherine Kelly Vidal
*Director of the United States Patent and Trademark Office*